US012062863B2

(12) United States Patent
Ott et al.

(10) Patent No.: US 12,062,863 B2
(45) Date of Patent: Aug. 13, 2024

(54) ANTENNA DEVICE

(71) Applicant: Sony Group Corporation, Tokyo (JP)

(72) Inventors: Arndt Ott, Stuttgart (DE); Jim Yip, Stuttgart (DE)

(73) Assignee: SONY GROUP CORPORATION, Tokyo (JP)

( * ) Notice: Subject to any disclaimer, the term of this patent is extended or adjusted under 35 U.S.C. 154(b) by 49 days.

(21) Appl. No.: 17/692,207

(22) Filed: Mar. 11, 2022

(65) Prior Publication Data

US 2022/0376397 A1 Nov. 24, 2022

(30) Foreign Application Priority Data

Mar. 26, 2021 (EP) .................................... 21165136

(51) Int. Cl.
*H01Q 9/04* (2006.01)
*H01Q 21/08* (2006.01)

(52) U.S. Cl.
CPC ........... *H01Q 9/0414* (2013.01); *H01Q 21/08* (2013.01)

(58) Field of Classification Search
CPC ...... H01Q 9/04; H01Q 9/0407; H01Q 9/0414; H01Q 9/0428; H01Q 21/06; H01Q 21/065; H01Q 21/08; H01Q 5/30; H01Q 5/378; H01Q 1/36; H01Q 1/38
See application file for complete search history.

(56) References Cited

U.S. PATENT DOCUMENTS

| | | | | |
|---|---|---|---|---|
| 4,070,676 A * | 1/1978 | Sanford | H01Q 9/0414 | 343/700 MS |
| 4,761,654 A * | 8/1988 | Zaghloul | H01Q 9/0457 | 343/700 MS |
| 4,827,271 A * | 5/1989 | Berneking | H01Q 5/378 | 343/846 |
| 4,835,538 A * | 5/1989 | McKenna | H01Q 9/0414 | 343/700 MS |
| 5,003,318 A * | 3/1991 | Berneking | H01Q 9/0414 | 343/700 MS |
| 5,444,452 A * | 8/1995 | Itoh | H01Q 5/42 | 343/769 |
| 6,181,277 B1 * | 1/2001 | Kesler | H01Q 19/10 | 343/700 MS |
| 6,812,891 B2 * | 11/2004 | Montgomery | H01Q 5/40 | 343/702 |
| 6,977,614 B2 * | 12/2005 | Poe | H01Q 21/0075 | 343/846 |
| 6,982,672 B2 * | 1/2006 | Lin | H01Q 9/0414 | 343/846 |

(Continued)

OTHER PUBLICATIONS

Ma et al., "Wide Bandwidth Stacked Patch Antenna on Fourteen Layers Microwave Board", IEEE, 2006, pp. 2031-2034.

*Primary Examiner* — Jason M Crawford
(74) *Attorney, Agent, or Firm* — XSENSUS LLP

(57) ABSTRACT

Antenna device comprising one or more antennas, and a feeding element configured to feed a feeding signal to the one or more antennas. An antenna includes a substrate, a first patch arranged on a first layer of the substrate, and a second patch arranged on a second layer of the substrate substantially parallel to the first layer, wherein the first patch and the second patch have a different size and/or are offset with respect to each other in a direction substantially parallel to the first and second layers.

18 Claims, 13 Drawing Sheets

(56) References Cited

U.S. PATENT DOCUMENTS

| | | | | |
|---|---|---|---|---|
| 7,164,385 | B2 * | 1/2007 | Duzdar | H01Q 5/40 343/700 MS |
| 7,202,818 | B2 * | 4/2007 | Anguera Pros | H01Q 1/36 343/846 |
| 7,253,770 | B2 * | 8/2007 | Yegin | H01Q 9/0421 343/700 MS |
| 7,277,056 | B1 * | 10/2007 | Thiam | H01Q 5/40 455/132 |
| 7,800,542 | B2 * | 9/2010 | Li | H01Q 5/378 343/700 MS |
| 8,174,455 | B2 * | 5/2012 | Miyoshi | H01Q 9/0414 343/855 |
| 11,522,299 | B2 * | 12/2022 | Park | H01Q 21/065 |
| 2002/0175871 | A1 | 11/2002 | Johansson et al. | |
| 2004/0032368 | A1 * | 2/2004 | Spittler | H01Q 9/0414 343/700 MS |
| 2004/0090369 | A1 * | 5/2004 | McCarrick | H01Q 9/0414 343/700 MS |
| 2004/0090370 | A1 * | 5/2004 | McCarrick | H01Q 21/0075 343/700 MS |
| 2008/0122697 | A1 * | 5/2008 | Mierke | H01Q 9/0414 343/700 MS |
| 2011/0279344 | A1 * | 11/2011 | He | H01Q 21/08 343/872 |
| 2012/0212384 | A1 * | 8/2012 | Kam | H01Q 1/2283 343/834 |
| 2015/0236425 | A1 * | 8/2015 | Sudo | H01Q 9/42 343/700 MS |
| 2017/0054217 | A1 * | 2/2017 | Hashimoto | H01Q 9/0457 |
| 2017/0201025 | A1 | 7/2017 | Lea et al. | |
| 2019/0020121 | A1 * | 1/2019 | Paulotto | H01Q 21/28 |
| 2019/0319364 | A1 * | 10/2019 | Yang | H01Q 9/0414 |
| 2020/0021037 | A1 * | 1/2020 | Wu | H01Q 9/0457 |
| 2020/0067178 | A1 * | 2/2020 | Hu | H01Q 1/36 |
| 2020/0067191 | A1 * | 2/2020 | Rogers | H01Q 9/045 |
| 2020/0076078 | A1 * | 3/2020 | Tehran | H01Q 5/50 |
| 2020/0127387 | A1 * | 4/2020 | Park | H01Q 9/30 |
| 2020/0287287 | A1 * | 9/2020 | Ying | H01Q 9/0407 |
| 2020/0295437 | A1 * | 9/2020 | Ueda | H01Q 9/0407 |
| 2020/0328518 | A1 * | 10/2020 | Park | H01Q 9/0414 |
| 2021/0151853 | A1 * | 5/2021 | Park | H01Q 1/2283 |
| 2022/0200149 | A1 * | 6/2022 | Tamrakar | H01Q 9/0457 |
| 2022/0368028 | A1 * | 11/2022 | Govoni | H01Q 25/02 |
| 2022/0376397 | A1 * | 11/2022 | Ott | H01Q 21/08 |

* cited by examiner

ANTENNA DEVICE

CROSS-REFERENCE TO RELATED APPLICATION

The present application claims priority to European Patent Application No. 21165136.9, filed Mar. 26, 2021, the entire contents of which are incorporated herein by reference.

BACKGROUND

Field of the Disclosure

The present disclosure relates to an antenna device.

Description of Related Art

Various PCB (printed circuit board) based antenna or antenna array solutions are known for usage with fully integrated radar sensors or wireless communication systems in the mm-wave (millimeter-wave) frequency range. In most commercial products single layer patch antennas are applied. Most common types of antennas are series-fed patch or combline antenna arrays because of their compact size and high gain.

However, the useful bandwidth of series-fed antenna arrays is limited. Good sidelobe suppression requires amplitude tapering which reduces the bandwidth further. Furthermore, system miniaturization is difficult to achieve by conventional microstrip feeding networks.

The "background" description provided herein is for the purpose of generally presenting the context of the disclosure. Work of the presently named inventor(s), to the extent it is described in this background section, as well as aspects of the description which may not otherwise qualify as prior art at the time of filing, are neither expressly or impliedly admitted as prior art against the present disclosure.

SUMMARY

It is an object to provide an antenna device that provides an increased overall gain, allows system miniaturization, operates in an increased overall bandwidth and/or sufficiently suppresses sidelobes.

According to an aspect of the present disclosure there is provided an antenna device comprising

- one or more antennas, and
- a feeding element configured to feed a signal to the one or more antennas,
- wherein an antenna includes
  - a substrate having a first substrate layer and a second substrate layer,
  - a first patch arranged on the first substrate layer, and
  - a second patch arranged on the second substrate layer,
- wherein the first patch and the second patch have a different size and/or are offset with respect to each other in a direction substantially parallel to the first and second substrate layers.

According to an aspect of the present disclosure there is provided an antenna device comprising

- one or more antennas, and
- a feeding element configured to feed a signal to the one or more antennas,
- wherein an antenna includes
  - a substrate having a first substrate layer and a second substrate layer,
  - a first patch arranged on the first substrate layer, and

- a second patch arranged on the second substrate layer, and
  - one or more vias between the first patch and the second patch.

One of the aspects of the disclosure is to provide a dual- or multi-layer stacked patch antenna that may be mounted on a multilayer PCB. The electromagnetic wave carrying the signal information propagates from electronic devices to the antenna and vice versa. The antenna may be placed on one side of the PCB whereas the electronic devices may be placed on the opposite side of the PCB. Interconnection of antenna and frontend components may be achieved by employing a mm-wave through signal via with multiple matching structures. Unwanted modes on the stacked patches may be suppressed by virtual AC (alternating current) short circuits. Therefore, an antenna radiation efficiency of more than 50% in a frequency range between 76-81 GHz can be achieved.

The arrangement of a compact feeding network may ensure amplitude tapering on the antenna patches while having almost no impact on the radiation characteristic. An offset arrangement of the dual patches results in a sidelobe suppression below −15 dB over the entire frequency range or dedicated frequency bands. The mm-wave signal may be fed to the antenna patches by employing a parallel feed network. Multiple parallel-fed antenna array can be arranged side by side in a half wavelength configuration. The obtained results indicate that the presented antenna device reduces the form factor of PCB based mm-wave radar systems while obtaining better wideband radiation characteristics compared to conventional patch antenna arrays.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWING

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE EMBODIMENTS

An antenna is a commonly used part of a transmitter and a receiver of many electronic systems, such as radars and mobile or wireless communication systems. Antennas can be configured in many different sizes and forms, one of which is being a microstrip patch antenna, which has the advantages of being small in size and which can be fabricated directly on a PCB together with other circuitries, thus reducing the production costs. A single antenna has a fixed gain (which relates to the amount of energy it can radiate or receive) and fixed beam angles. In order to increase the overall gain and/or to generate a beam with desired angles, an antenna array is often used.

Figure 1A:
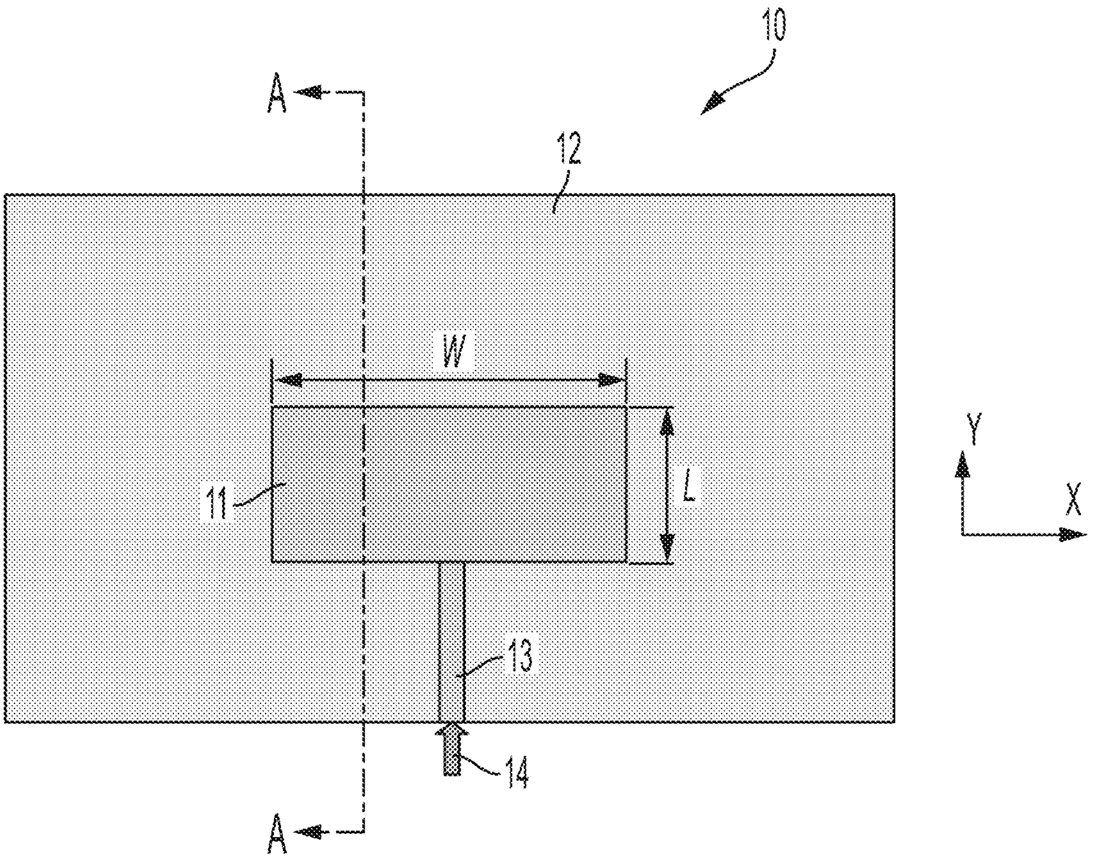
FIGS. 1A and 1B show a top view and a cross-sectional view of a known single patch antenna.
Figure 1B:
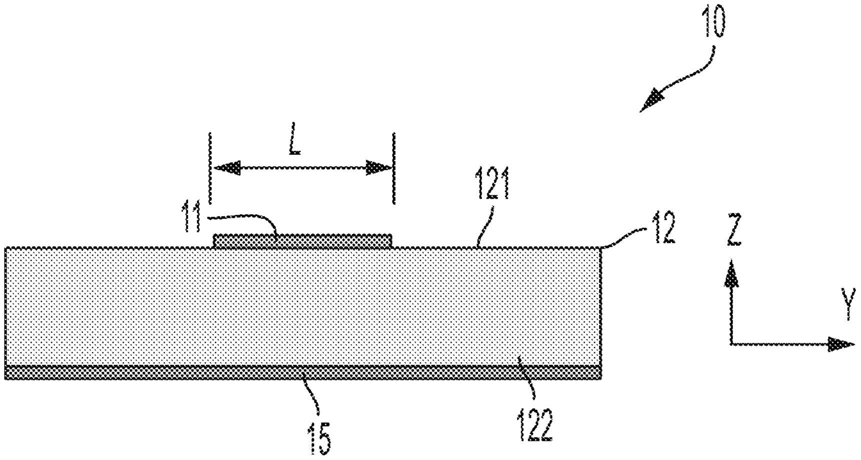

Referring now to the drawings, wherein like reference numerals designate identical or corresponding parts throughout the several views, FIG. 1 shows a top view (FIG. 1A) and a cross-sectional view at section A-A (FIG. 1B) of a known single patch antenna 10 (representing a known antenna device). The radiating element in this antenna 10 is a patch 11 (i.e. a top metallization) at the top surface 121 of a substrate 12 comprising a single substrate layer. A feedline 13 is provided for feeding a signal (i.e. energy; also called feeding signal) provided at an input port 14 to the patch 11. The feedline 13 is thus not part of the radiating structure, although it can affect the radiation pattern as it disrupts the regular shape of the rectangular patch 11. At the bottom surface 122 of the substrate 12 a ground layer 15 (also called ground metallisation or ground metal layer) is arranged.

The substrate 10 is generally formed by a dielectric material. The patch 11 (also called radiator patch) and the ground layer 15 are generally made from metal. The patch 11 can be in many different shapes, e.g. square or triangle, etc. The commonly used shape is a rectangle. To meet the radiating condition, the length, L, of the patch 11 should be just about or slightly less than half guided wavelength of the signal. The width of the patch is indicated by W. Higher order mode excitation may be avoided by keeping W shorter than two times L.

There are many ways to launch/deliver a signal to the radiating element. Examples include:

- Using a feedline as shown in FIG. 1A. The feedline is on the same top metal layer as the patch.
- Using a through PCB hole (generally known as "via" or "vial hole") underneath the patch, which can be seen as a kind of vertical feedline.
- Using an aperture coupled patch where a slot in the ground plane is placed directly below the patch so that the energy can coupled/launched from the slot on to patch without contact.

Figure 2A:
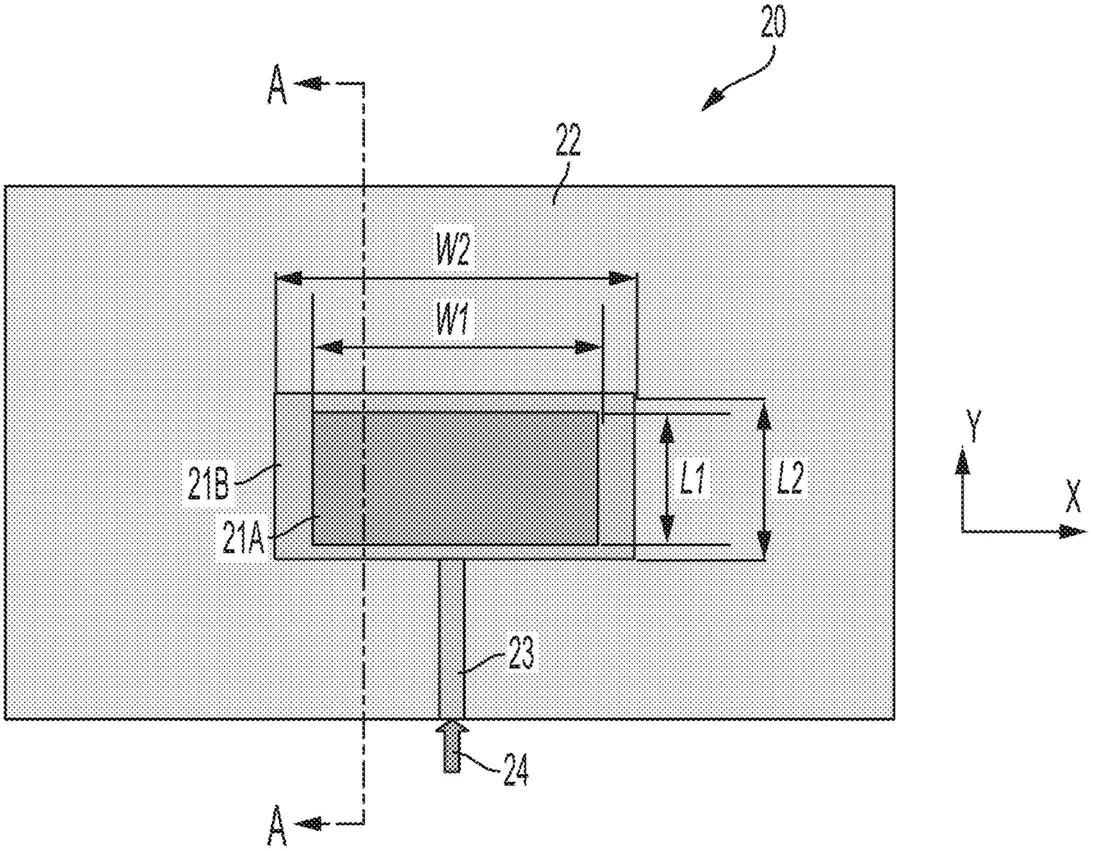
FIGS. 2A and 2B show a top view and a cross-sectional view of a two-layer stacked patch antenna according to an embodiment of the present disclosure.
Figure 2B:
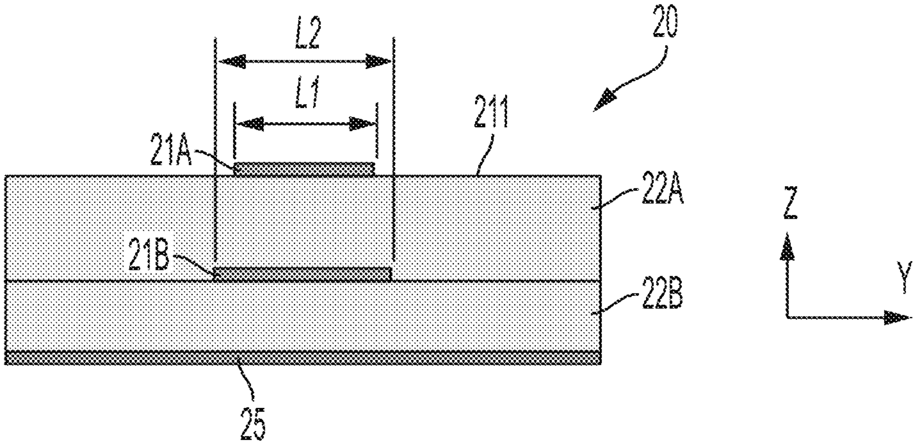

A single-patch antenna as shown in FIG. 1 has limited and narrow operating bandwidth around the center radiating frequency which is governed by the patch length, L. One of the ways to increase the operating bandwidth is to provide two or more different patches that are radiating signals at different frequencies and to stack these two or more patches upon each other to form a single antenna device, which has larger bandwidth than a single patch antenna as shown in FIG. 1. FIG. 2 shows a top view (FIG. 2A) and a cross-sectional view at section A-A (FIG. 2B) of a two-layer stacked patch antenna 20, representing an embodiment of an antenna device according to the present disclosure.

The a two-layer stacked patch antenna 20 comprises two patches 21A, 21B, a substrate 22 comprising two substrate layers 22A, 22B, a feedline 23 with a port 24, and a ground layer 25. The upper patch 21A is arranged on the top surface 211 of the upper substrate layer 22A. The lower patch 21B is arranged between the upper substrate layer 22A and the lower substrate layer 22B, i.e., on the upper surface of the lower substrate layer 22B.

The material(s) properties, including dielectric constant(s) and thickness(es), etc., and metal thickness(es) may all have an effect on the guided wavelength for each radiating frequency, i.e. the design of the length of each patch. The two substrate layers 22A, 22B may or may not be made from the same material, and may or may not have the same thickness. Different layers of metal may be of different thicknesses.

There are different types of PCB layer stacks available. In an embodiment a prepreg-prepreg-prepreg-core-prepreg-prepreg-prepreg configuration may be used. This means that only the center part of the PCB is made of rigid material and the upper copper layers are pressed together with prepreg layers. These layers might suffer from height variation. Furthermore, losses on prepreg material are approximately two times higher than on core material. An advantage of such a stack is the great design flexibility as micro via holes can be realized on every layer. Conventional stacks e.g. use a core-prepreg-core-prepreg-core-repreg-core configuration. As core material is rigid, the losses are very low and the height is constant. However, there are small deviations in the material parameters of prepreg and core material although they are very similar. Typical values for the dielectric constant of core and prepreg materials are between 2.5 and 4.

On the feedlines higher order modes should be avoided. Assuming a dielectric constant of 3, the thickness of the lower substrate layer 22B should be between 50 μm and 100 μm. If the height between the upper patch and the ground plane is increased a higher relative bandwidth of the patch antenna is obtained. Therefore, the height of the upper substrate layer 22A should be between 70 μm and 300 μm if a dielectric constant of 3 is assumed.

There are many ways to launch energy to all different patches. In the embodiment shown in FIG. 2, the energy is being launched into the lower patch 21B by the feedline 23 and part of it is then been coupled onto the upper patch 21A remotely.

The width of the two (or more; see FIG. 8) patches in a multi-layer stacked patch antenna, W1 and W2 in the embodiment of FIG. 2, may or may not be the same. The width of the patch is directly related to the gain of that radiating element, i.e., if they have different widths, they will have different gains at different frequencies. In the antenna 20 shown in FIG. 2 the upper patch 21A is smaller than the lower patch 21B.

Different from a single patch antenna, that can only work for a narrow band of frequency, the antenna 20 having different sizes of patches can work for more than one bands of frequencies. If these bands are close together, it can be seen that the antenna is working for a very wide band of frequency.

In still other embodiments, instead of or in addition to the different sizes of the patches 21A, 21B, they may be offset (in x- and/or y-direction; preferably in width direction (=x-direction)) with respect to each other so that their symmetry lines (in z-direction) are not identical, but are offset (in x- and/or y-direction).

Figure 8B:
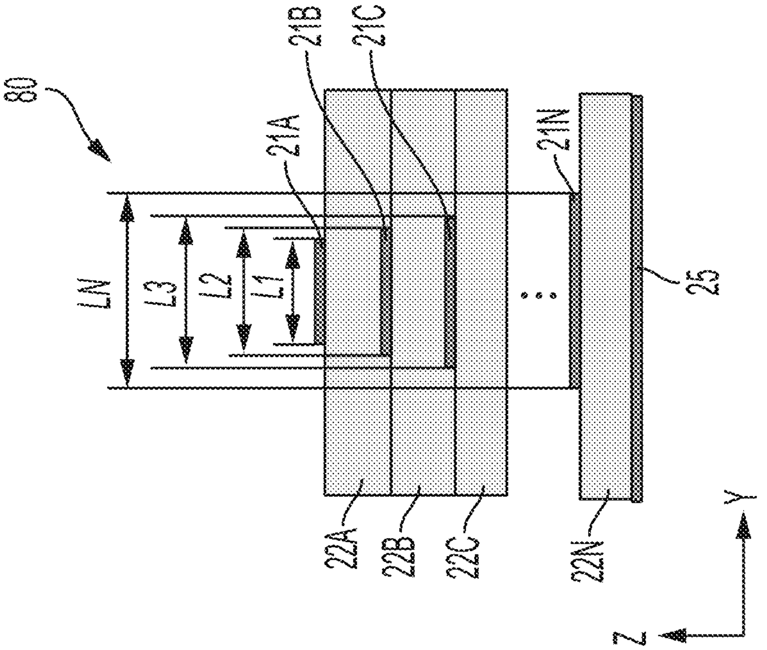
FIGS. 8A and 8B show a top view and a cross-sectional view of a multi-layer stacked patch antenna according to an embodiment of the present disclosure.
Figure 8A:
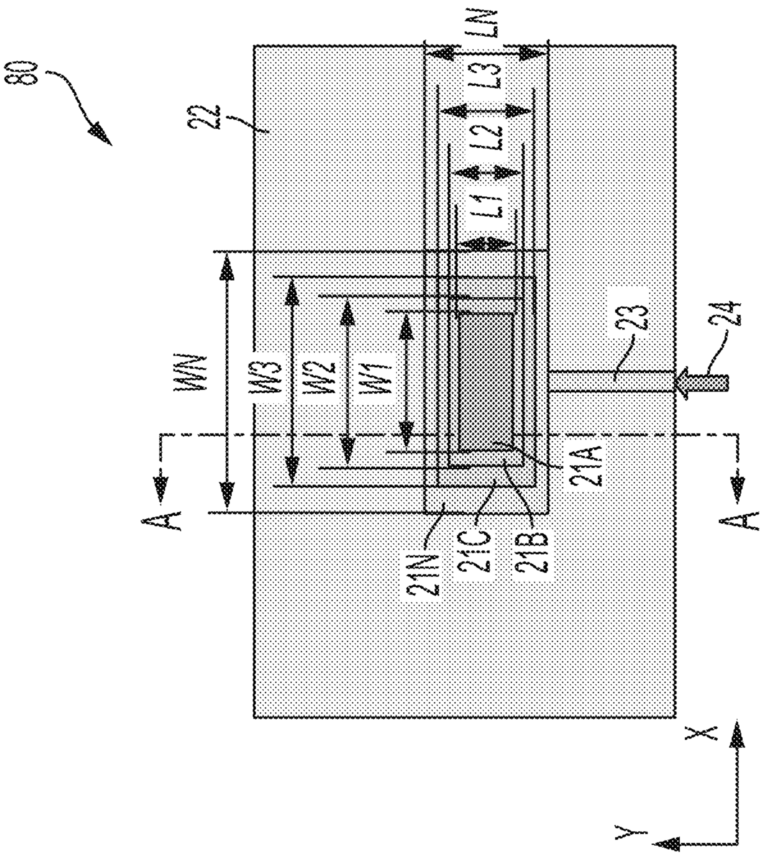

FIG. 8 shows a top view (FIG. 8A) and a cross-sectional view at section A-A (FIG. 8B) of a multi-layer stacked patch antenna 80 according to an embodiment of the present disclosure comprising multiple patches 21A to 21N separated by multiple substrate layers 22A to 22N. The multiple patches 21A to 21N all have different lengths and widths, but in other embodiment two or more of them may have identical lengths and/or widths.

It should be noted that the explanations given above for length, width and materials of the antenna elements of the known antenna 10 shown in FIG. 1 mutually apply for the antennas of the present disclosure.

Figure 3A:
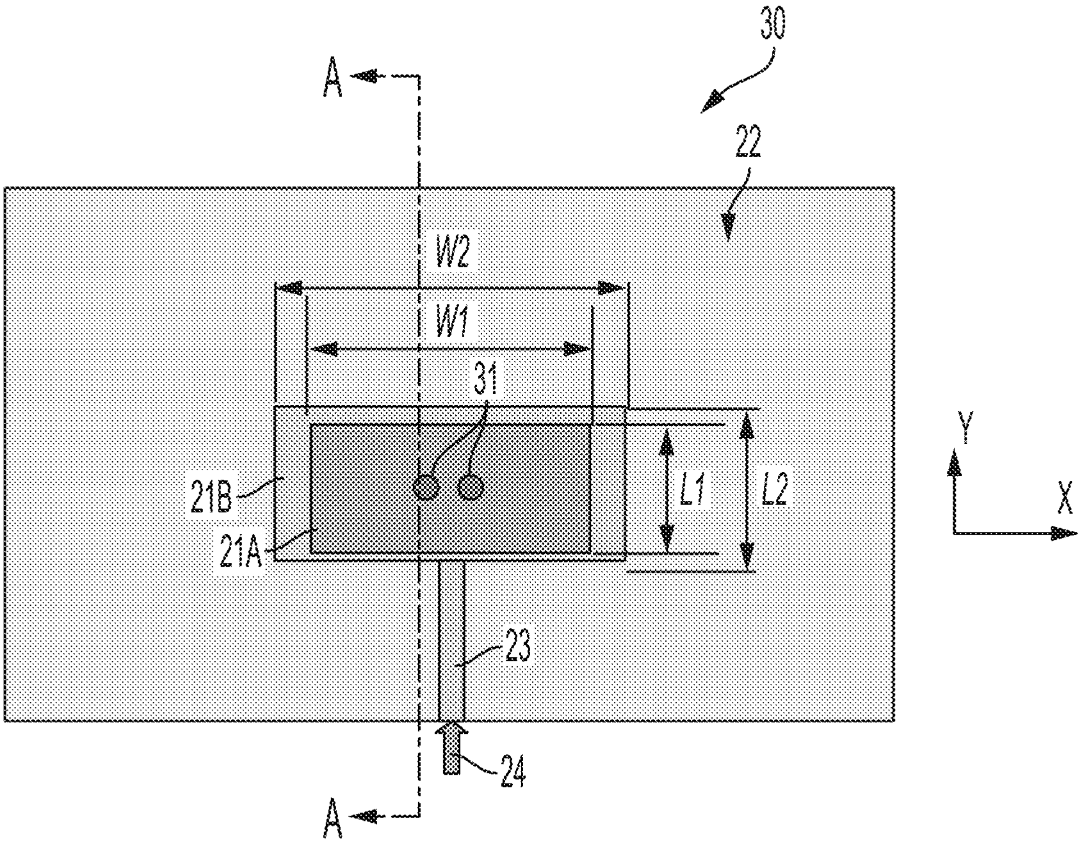
FIGS. 3A and 3B show a top view and a cross-sectional view of a two-layer stacked patch antenna with via holes according to an embodiment of the present disclosure.
Figure 3B:
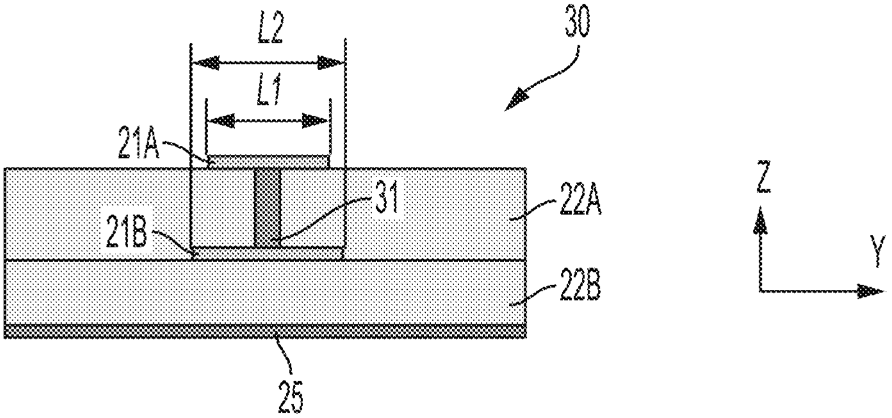

If one or more radiating elements are isolated, e.g. the upper patch 21A of the antenna 20, a higher-order mode may appear in those patches. In order to eliminate, or to minimize, the effect of unwanted higher-order modes, via hole(s) can be introduced to link different patches. FIG. 3 shows a top view (FIG. 3A) and a cross-sectional view at section A-A (FIG. 3B) of a two-layer stacked patch antenna 30 having via holes 31 linking patches 21A and 21B, representing another embodiment of an antenna device according to the present disclosure.

Apart from shorting out certain unwanted mode, the via holes 31 enable to feed energy between the patches 21A, 21B. There could be more than two via holes. Further, the location of the via holes may be in the middle of the patch, but finally depends on design requirements. The desired via positions can e.g. be obtained through a three-dimensional electromagnetic time-domain simulation or any other suitable technique.

Figure 4A:
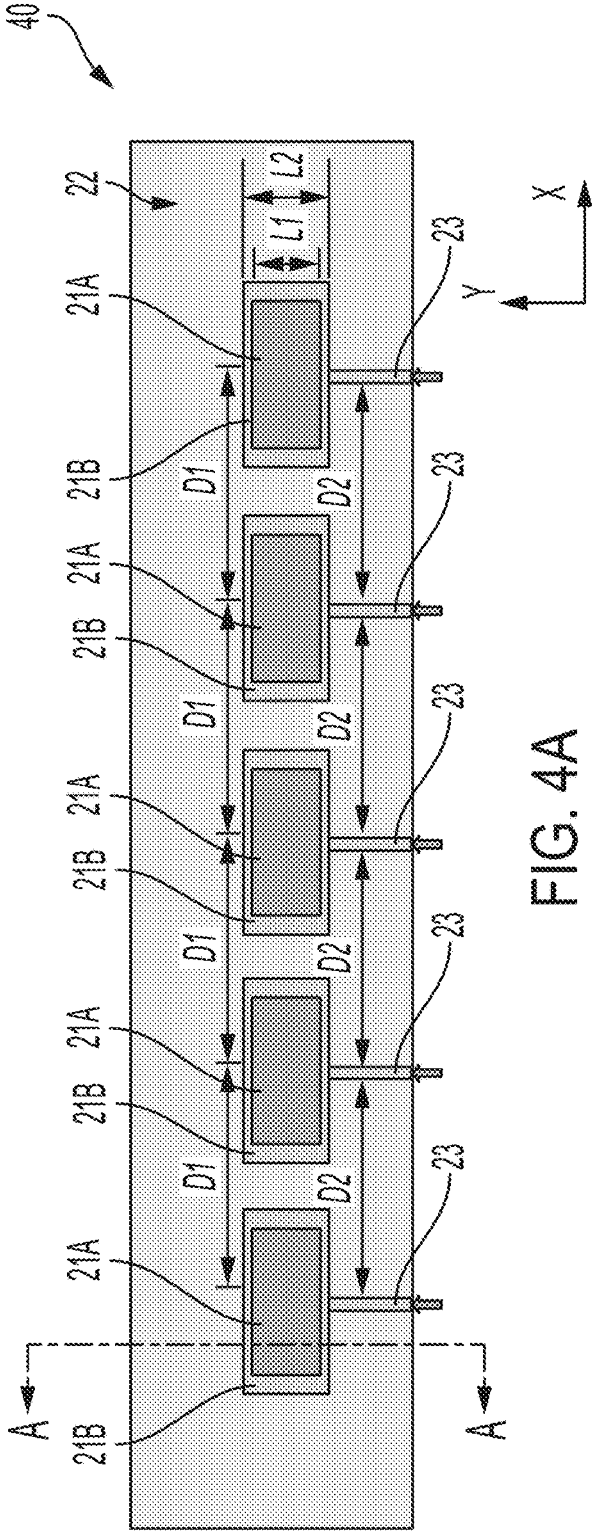
FIGS. 4A, 4B and 4C show a top view and two cross-sectional views of an antenna array of two-layer stacked patch antennas according to an embodiment of the present disclosure.
Figure 4B:
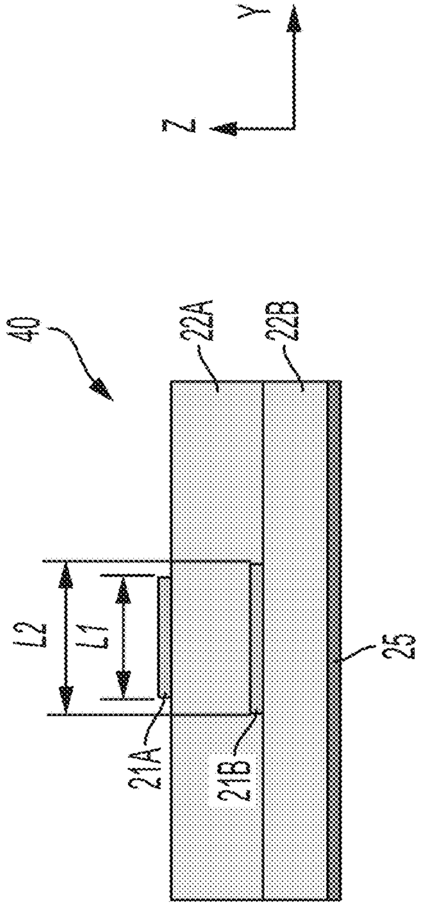

FIG. 4 shows a top view (FIG. 4A) and two cross-sectional views (FIG. 4B at section A-A and 4C at section B-B) of an antenna array 40 of two-layer stacked patch antennas, representing another embodiment of an antenna device according to the present disclosure.

In this embodiment, the array comprises five antennas, but the number may be smaller or larger. Each of the antennas of the array may be configured like the antennas shown in FIG. 2 or 3.

The antennas are arranged horizontally in this embodiment. By adjusting the phase of the feeding signals on the antenna beam steering in the azimuth direction can be achieved. However, as in this embodiment it is one-dimensional array (having a single row of antennas and multiple columns), the radiation in elevation direction will substantially be the same as for a single antenna and cannot be changed. In another embodiment, a two-dimensional array with multiple rows and columns of antennas may be provided, enabling that beam-steering in azimuth and elevation direction is supported.

One of the potential effects of having an antenna array is that multiple side-lobes may be introduced. These side-lobes are generally much more significant than those of a single antenna. Side-lobes may be useful for certain applications, but generally, they are not desirable. The side-lobe level is frequency dependent which relates to the size of the patch. Although it can be suppressed by adjusting the separation between radiating elements and the radiated power (antenna gain and signal level can be adjusted) of each radiating element, this basic side-lobe suppression technique has very narrow bandwidth, i.e. it works well in one frequency but get worse further away from that frequency. The use of stacked antennas radiating at different frequencies provides the option to design beam angles and to control side-lobe levels at different frequencies.

Figure 4C:
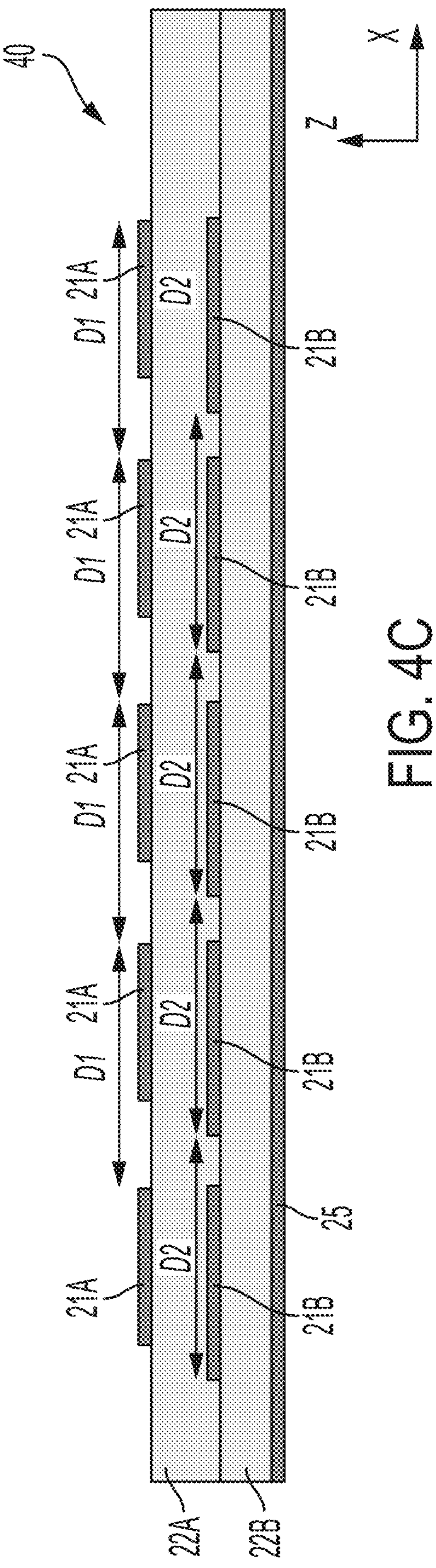

In the embodiment shown in FIG. 4, the distances D1 between the upper patches 21A (in horizontal direction) are equal and the distances D2 between the feedlines (in horizontal direction) and between the lower patches 21B (in horizontal direction) are equal, but D1 and D2 are not equal. The position of the upper patches 21A with respect to the associated lower patches 21B thus changes in horizontal direction as clearly seen in FIGS. 4A and 4C. This provides that the antennas radiate at different frequencies and allows to control side-lobe suppression individually for each antenna. In other embodiments the distances D1 and D2 may all be equal. The distances and offsets shown in FIG. 4 may be different from the distances and offsets shown in FIG. 4.

Further, in the embodiment shown in FIG. 4, the upper patches 21A all have the same width and length and the lower patches 21B all have the same width and length. In other embodiments the width and/or length of the upper patches and/or the lower patches may vary. By varying the width, the amount of radiation can be controlled to achieve low sidelobes. By varying the length, the operating frequency can be changed, i.e., more constant radiation properties may be achieved over the entire frequency band.

Via the feedlines 23 different or identical feeding signals can be individually provided to the antennas. In other embodiments, all antennas or groups of antennas are provided with the same feeding signal.

Different widths of the patches may be useful in an antenna array configuration. In an embodiment all patches on the first substrate layers may have the same length and all patches on the second substrate layers may have the identical length. The length of the patches that are arranged on the first substrate layer might have the same or different length compared to the patches arranged on the second substrate layer. Even if the length of the patches on the first and second substrate layers are kept identical, the operating frequency of the patches is different. This is due to the fact that the patches on the second substrate layer are encapsulated by substrate material. Hence, the effective dielectric constant for patches on the first substrate layer is different compared to the effective dielectric constant for patches on the second substrate layer.

FIG. 5 shows a top view (FIG. 5A) and three cross-sectional views (FIG. 5B at section A-A, 5C at section C-C and 5D at section B-B) of an antenna array 50 of two-layer stacked patch antennas, representing another embodiment of an antenna device including top layer feedline networks according to the present disclosure. In this embodiment the substrate 22 comprises multiple substrate layers 22A to 22G separated by further metal layers 26A to 26F.

Figure 5A:
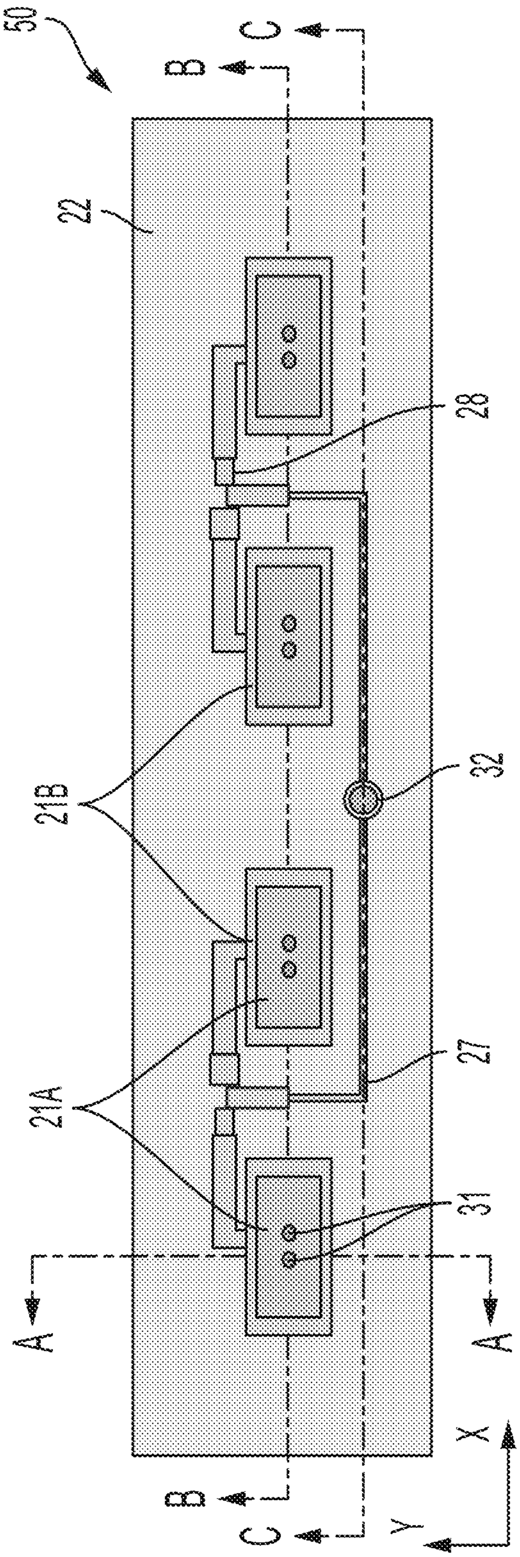
FIGS. 5A, 5B, 5C and 5D show a top view and three cross-sectional views of an antenna array of two-layer stacked patch antennas including the feedline network according to an embodiment of the present disclosure.
Figure 5B:
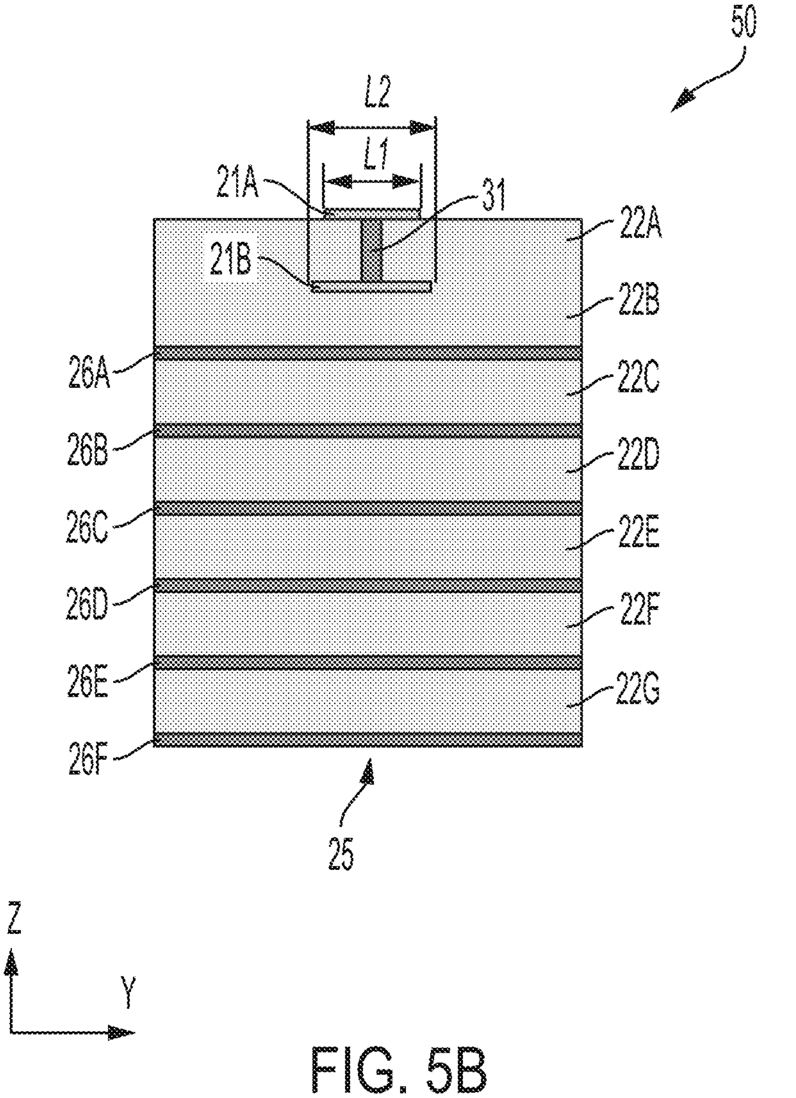
Figure 5C:
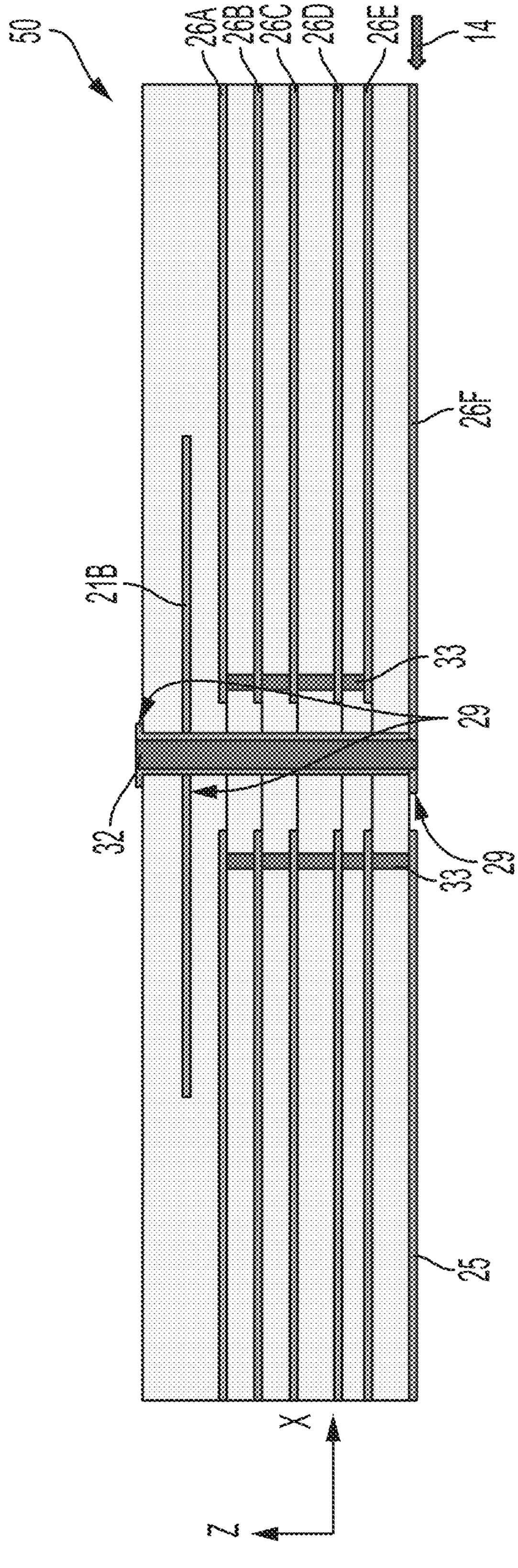
Figure 5D:
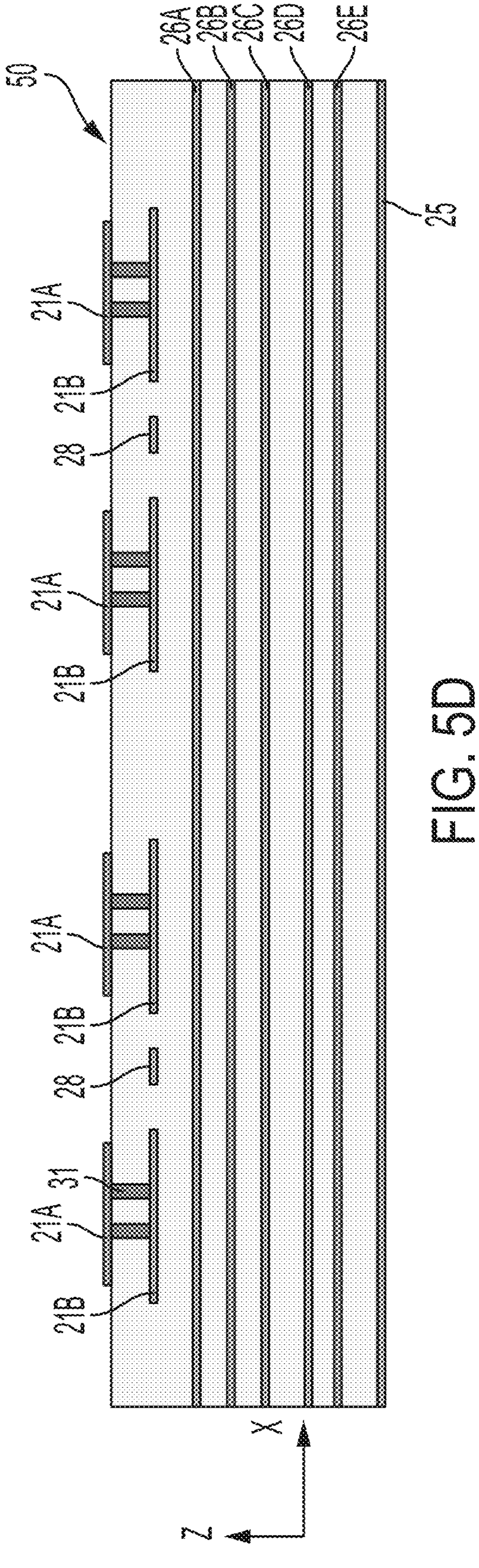

The mm-wave signal is fed from the bottom layer 26F of the PCB by applying a through hole via 32. As shown in FIG. 5C the via 32 is connected to the patches 21A and 21B and the bottom layer 26F by connection pads 29. Every layer is connected by individual vias 33. FIG. 5C only shows only two small vias. However, there are 4 vias on the right side connecting all layers and 5 vias on the left side connecting all layers. Purpose of the vias is to provide electromagnetic shielding around the through hole via.

A parallel microstripline network 27 on the second substrate layer 22B feeds the antenna elements. Power dividers 28 may additionally be applied in this embodiment to feed the antennas. Unequal power division can provide additional amplitude tapering on the antenna elements for increased sidelobe suppression. Optional additional structures on the feedline network 27 may provide antenna impedance matching.

Figure 6A:
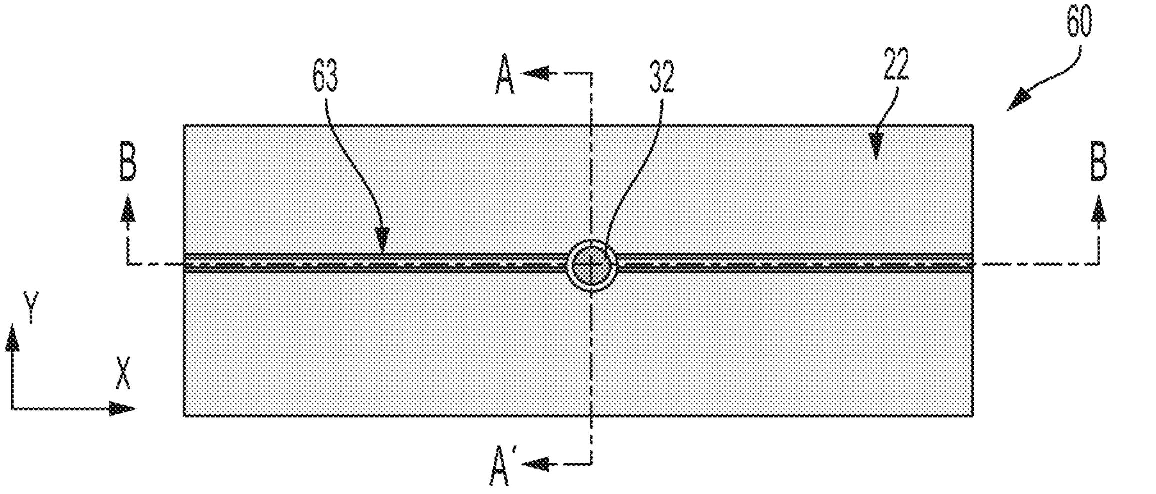
FIGS. 6A, 6B, 6C, 6D and 6E show a top view and two cross-sectional views of a front to back through hole via interconnect according to an embodiment of the present disclosure.
Figure 6B:
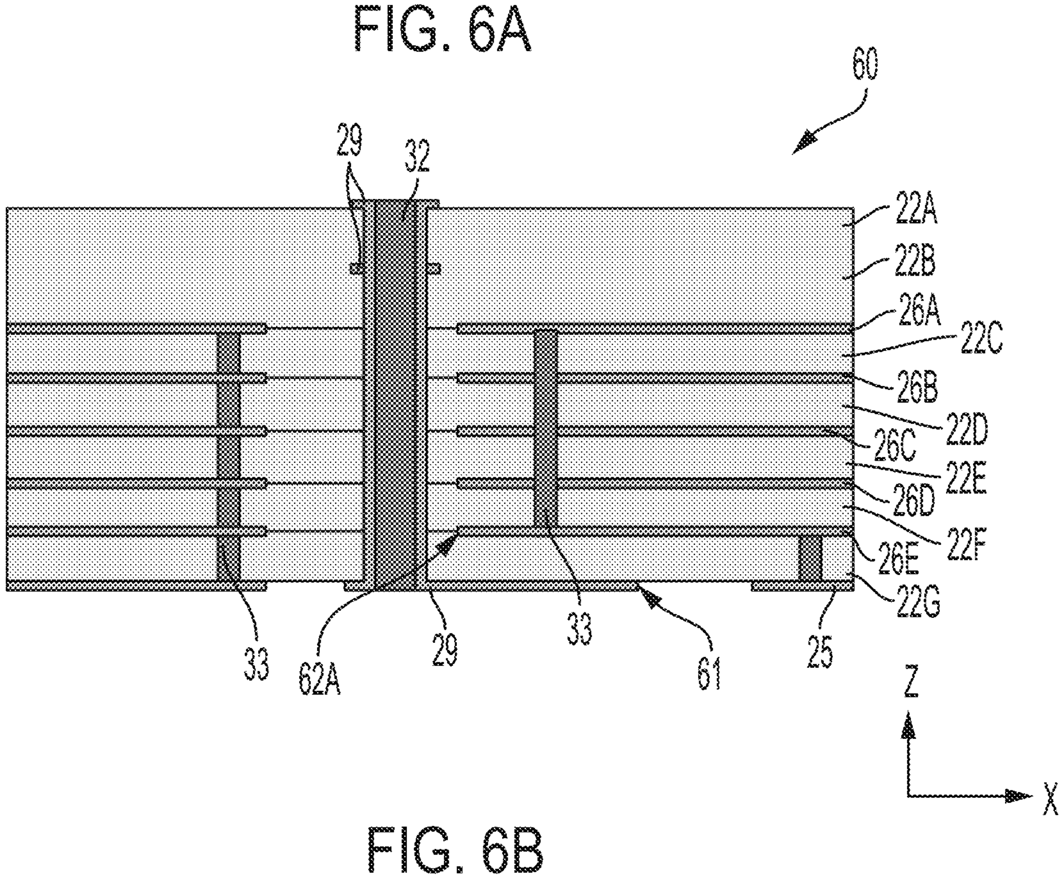
Figure 6C:
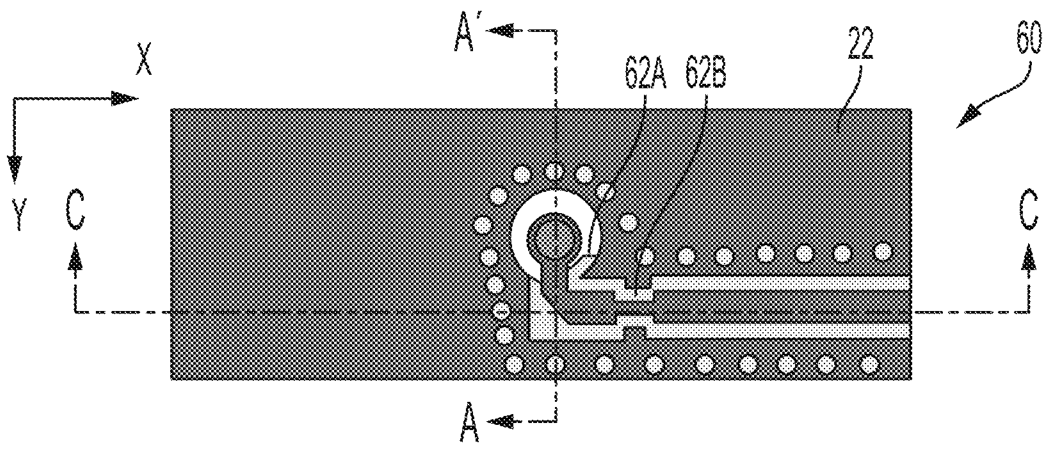
Figure 6D:
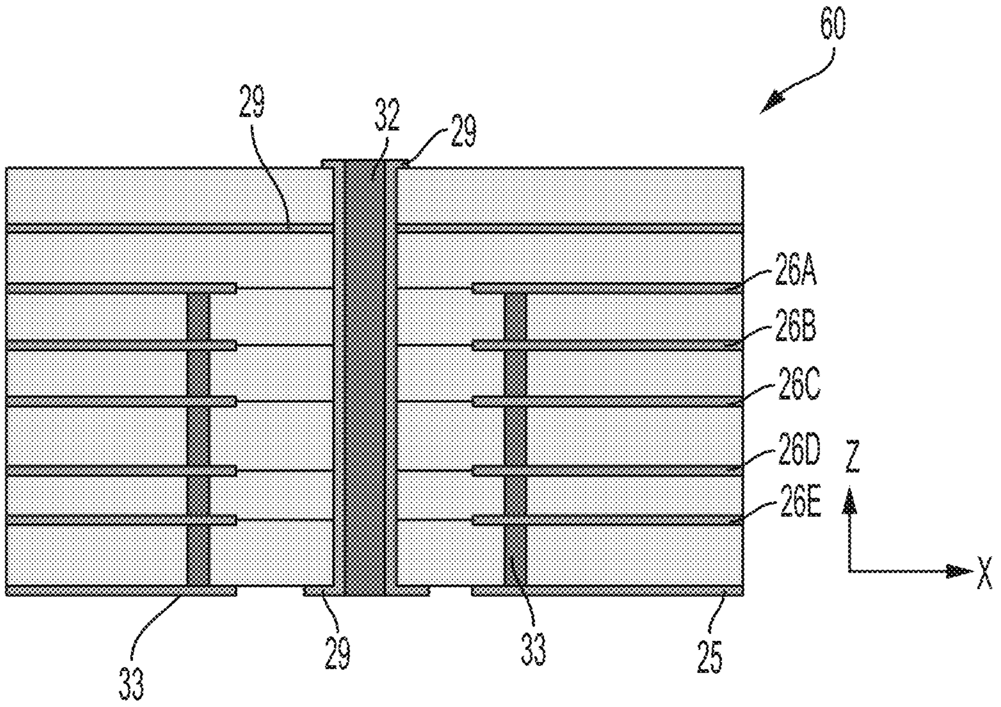
Figure 6E:
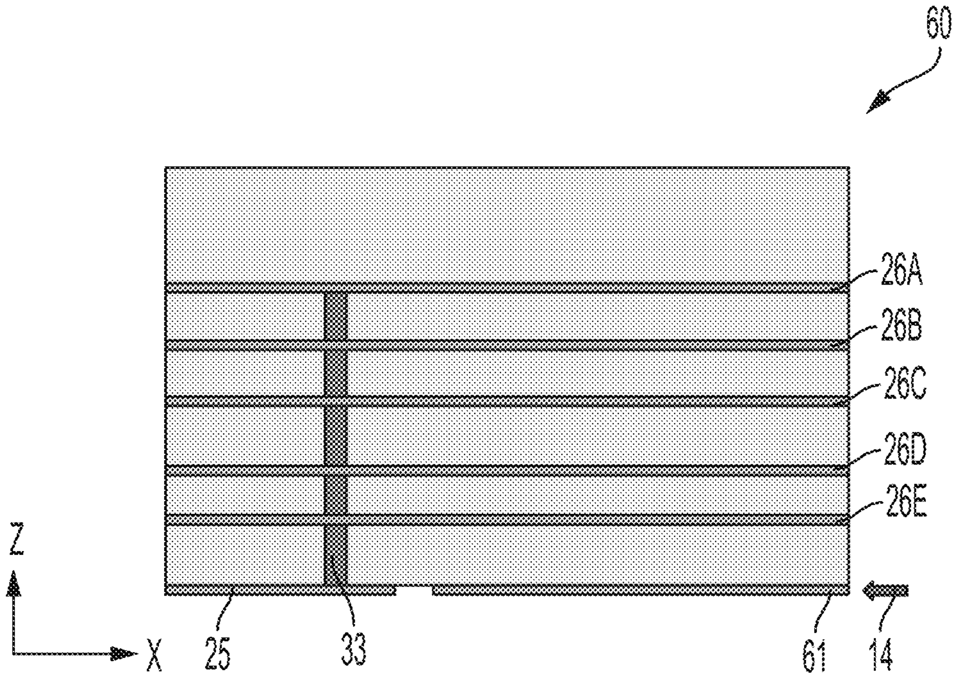

FIG. 6 shows a top view (FIG. 6A showing a second metal layer 63), a bottom view (FIG. 6C) and three cross-sectional views (FIG. 6B at section A-A', 6D at section B-B, and 6E at section C-C) of an antenna array 60 of two-layer stacked patch antennas, representing another embodiment of an antenna device including bottom layer feedline networks and a through PCB interconnect according to the present disclosure.

The mm-wave signal propagates on a transmission line 61 (e.g. microstrip line, coplanar waveguide) which is located on the bottom substrate layer 22G from an electronic device to the via hole interconnect of the via hole 32. The via hole 32 transfers the mm-wave signal from the bottom to the top layer or second metal layer where the mm-wave signal is coupled into the antenna feed network. The copper cutout distance of the metal layers and via diameter may be similar to a coaxial TEM mode waveguide. However, connection pads 29 which are larger than the via diameter may be required due to manufacturing tolerances of given PCB process technologies. These pads 29 form additional capacitances and inductances which have an impact on the impedance. To overcome such potential impairments, additional matching structures may be applied. A first matching structure 62A is placed on the bottom layer 26E. A 90-degree bend is integrated into the matching structure 62B. Other matching structures 62A formed by arcs may be placed on the inner layers 26A to 26D.

Figure 7A:
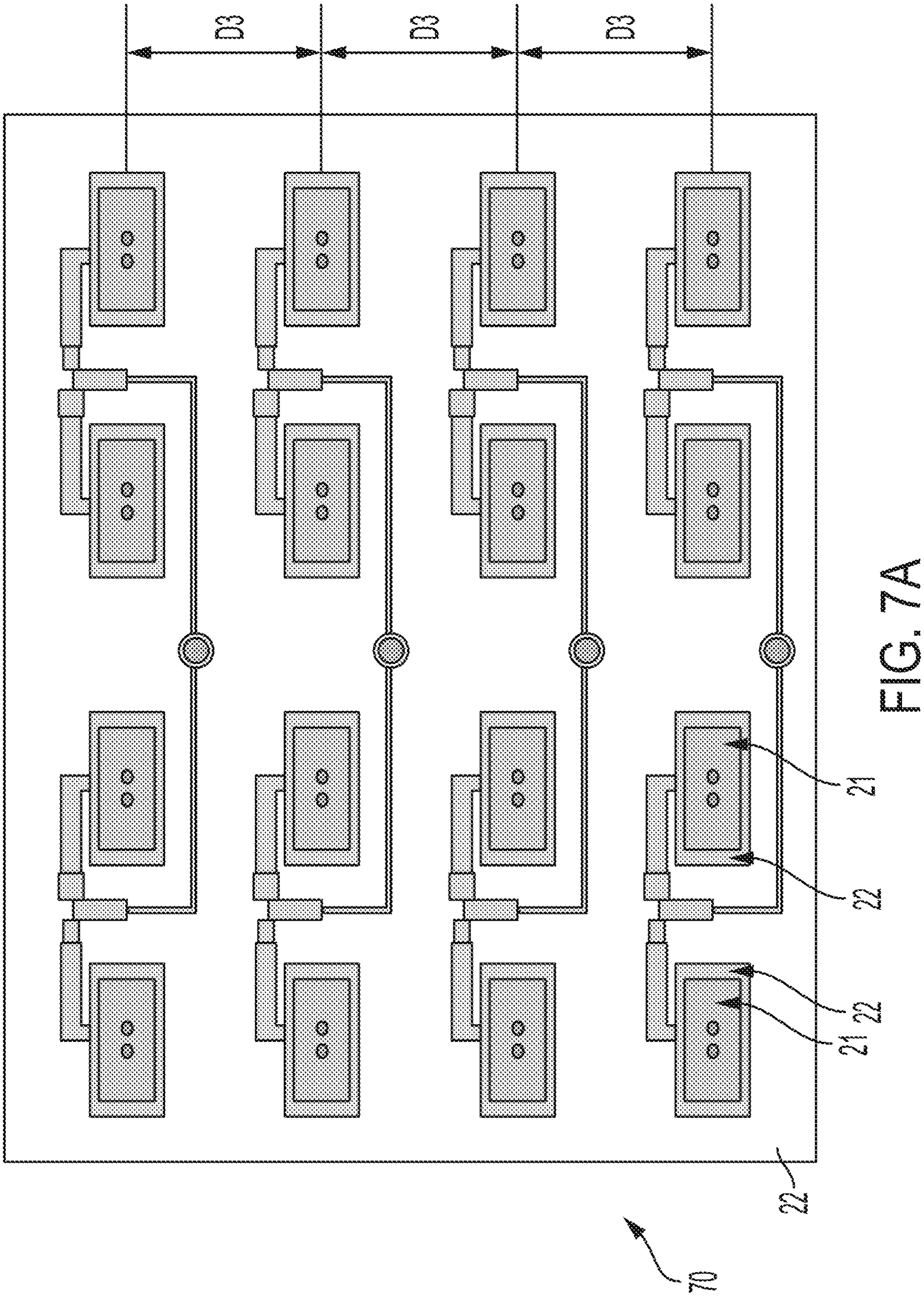
FIGS. 7A and 7B show a top view and a bottom view of the parallel feed antenna array arranged in an array configuration which consists of multiple parallel feed antenna arrays according to an embodiment of the present disclosure.
Figure 7B:
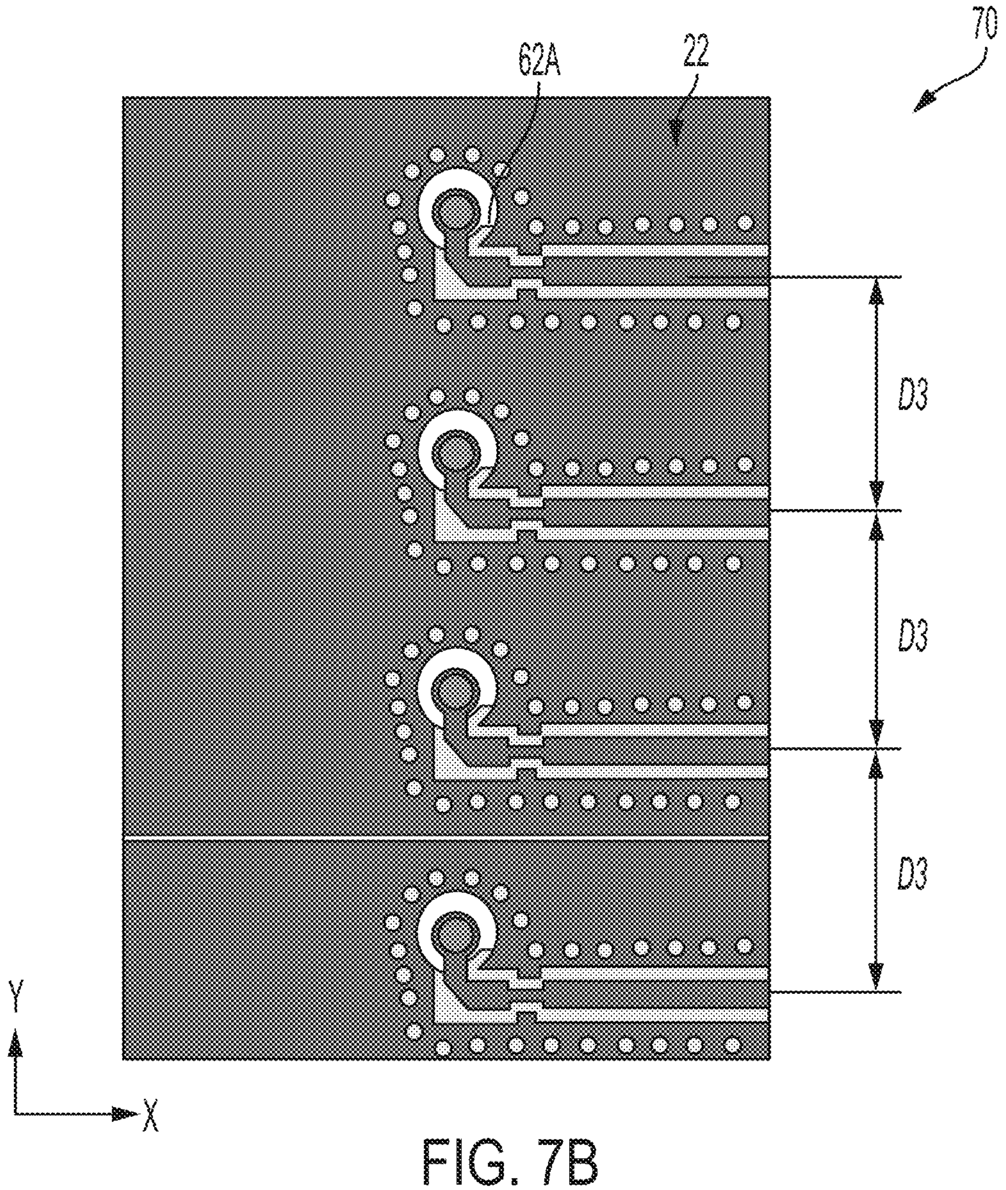

FIG. 7 shows a top view (FIG. 7A) and a bottom view (FIG. 7B) of multiple antenna arrays 70 of two-layer stacked patch antennas, which are arranged in a larger antenna array configuration according to the present disclosure.

A distance equal or less than half a wavelength in air between the antenna arrays (D3) is achieved by designing compact feed networks 27 on the top layer or second metal layer and introducing a 90-degree bend into the bottom layer matching structure 62A. The electronic device is placed close to the through via transition to minimize feedline losses.

According to the present disclosure various essential elements may be provided in an antenna device separately or in combination.

According to one feature, micro via holes are used linking between radiating patches to suppress higher-order mode in a multilayer patch antenna or an antenna array where unwanted modes on the stacked patches are suppressed by short circuit vias.

Since the length and width of each patch determine its intrinsic resonant frequency and antenna gain, respectively, each patch can be designed to have a different size for various frequencies and antenna gains (the gain can be varied to compensate for dispersion). To cover lower frequencies, the size of the patch is made larger. Higher-order resonant mode could appear under those large patches. To ensure mono-mode operation, micro via holes are introduced between the patches to suppress higher-order modes. These via holes additionally couple or feed energy (i.e. signal) to from one patch to another patch. The number of via holes and their positions can be designed to accomplish both of these functions.

According to another feature, used in an antenna array, the resonators are offset, i.e., patches on different metal layers are offset, to suppress side-lobes at different frequencies where the spacing of the antenna elements at different (metal) layers can be varied to achieve similar beam width and side-lobe level across a wider frequency band. Hence, different from a single-layer antenna array that has a narrow bandwidth, the proposed multi-layer stacked antenna radiating at different (narrow) frequency bands allows the spacing between patches at each layer to be different because the half-wavelength for different frequency is different.

According to the present disclosure a dual- or multi-layer stacked patch antenna which is mounted on a dual- or multi-layer PCB is presented. Three-dimensional time and frequency domain analysis are applied to characterize the antenna. Feeding of the antenna may be achieved from the backside of the PCB by employing a mm-wave signal via with multiple matching structures. Unwanted modes on the stacked patches are suppressed by short circuits. Therefore, an antenna radiation efficiency better than 50% in a frequency range between 76 GHz and 81 GHz is achieved. The arrangement of the compact feeding network ensures amplitude tapering on the antenna patches while having almost no impact on the radiation characteristic. An offset arrangement of the patches results in a sidelobe suppression below −15 dB over the entire frequency range or dedicated frequency bands. The highly compact antenna design ensures that the single antenna array can be arranged in a half wavelength MIMO array configuration. The results obtained indicate that the disclosed antenna device reduces the form factor of PCB based mm-wave radar systems while obtaining better wideband radiation characteristics compared to conventional patch antenna arrays.

According to preferred embodiments, which may be used in any arbitrary combination in practical realizations, feedlines may be routed from the lowest substrate layer and connected by a via to the antenna layer, matching circuits may be placed on the inner PCB layers (the lowest substrate layer), power dividers with unequal amplitude distribution may be placed on the second substrate layer, and a large two-dimensional array with half wavelength spacing among all radiating elements can be formed by cascading multiple antenna arrays side by side.

According to further embodiments a power divider may be applied that distribute power to different antenna elements in an antenna array. Further, in embodiments a large through-PCB via may be used that carries signals from one side of the PCB to the other side of the PCB.

Thus, the foregoing discussion discloses and describes merely exemplary embodiments of the present disclosure. As will be understood by those skilled in the art, the present disclosure may be embodied in other specific forms without departing from the spirit or essential characteristics thereof. Accordingly, the disclosure of the present disclosure is intended to be illustrative, but not limiting of the scope of the disclosure, as well as other claims. The disclosure, including any readily discernible variants of the teachings herein, defines, in part, the scope of the foregoing claim terminology such that no inventive subject matter is dedicated to the public.

In the claims, the word "comprising" does not exclude other elements or steps, and the indefinite article "a" or "an" does not exclude a plurality. A single element or other unit may fulfill the functions of several items recited in the claims. The mere fact that certain measures are recited in mutually different dependent claims does not indicate that a combination of these measures cannot be used to advantage.

It follows a list of further embodiments of the disclosed subject matter:

1. Antenna device comprising one or more antennas, and a feeding element configured to feed a signal to the one or more antennas, wherein an antenna includes a substrate having a first substrate layer and a second substrate layer, a first patch arranged on the first substrate layer, and a second patch arranged on the second substrate layer, wherein the first patch and the second patch have a different size and/or are offset with respect to each other in a direction substantially parallel to the first and second substrate layers.

2. Antenna device as defined in any one of the preceding embodiments, wherein the first patch and the second patch have a different width and substantially identical length.

3. Antenna device as defined in any one of the preceding embodiments, wherein the first patch and a second patch are offset with respect to each other in a width direction.

4. Antenna device as defined in any one of the preceding embodiments, comprising an array of two or more antennas.

5. Antenna device as defined in embodiment 4, wherein the difference in size of the first patch and the second patch is different for at least two antennas of the array.

6. Antenna device as defined in embodiment 4 or 5, wherein the offset between the first patch and the second patch is different for at least two antennas of the array.

7. Antenna device as defined in any one of the preceding embodiments, wherein an antenna comprises one or more vias between the first patch and the second patch.

8. Antenna device as defined in any one of the preceding embodiments, wherein the first substrate layer and the second substrate layer are made of different materials.

9. Antenna device as defined in any one of the preceding embodiments, wherein the first substrate layer and the second substrate layer are made of materials having a different dielectric constant.

10. Antenna device as defined in any one of the preceding embodiments, wherein the first substrate layer and the second substrate layer have a different thickness.

11. Antenna device as defined in any one of the preceding embodiments, wherein an antenna further comprises a ground metal layer arranged on a surface of the second substrate layer opposite to the surface of the second substrate layer on which the second patch is arranged.

12. Antenna device as defined in any one of embodiments 4 to 6, further comprising a power divider configured to distribute power to different antennas of the array.

13. Antenna device as in any one of the preceding embodiments, further comprising a through-substrate via configured to carry signals from one side of the substrate to the other side of the substrate.

14. Antenna device as defined in embodiment 13, further comprising matching structures connected to connection pads of the through-substrate via.

15. Antenna device comprising one or more antennas, and a feeding element configured to feed a signal to the one or more antennas, wherein an antenna includes a substrate having a first substrate layer and a second substrate layer, a first patch arranged on the first substrate layer, and a second patch arranged on the second substrate layer, and one or more vias between the first patch and the second patch.

16. Antenna device as defined in embodiment 15, comprising an array of two or more antennas.

The invention claimed is:

1. An antenna device, comprising:

an antenna; and a feedline to feed a signal to the antenna, wherein the antenna includes a first substrate layer, a second substrate layer below the first substrate layer along a first axis, the first axis being orthogonal to the first substrate layer and the second substrate layer, a first patch above the first substrate layer along the first axis, and a second patch above the second substrate layer along the first axis, a center of the first patch is offset with respect to a center of the second patch along a second axis which is orthogonal to the first axis, and the feedline extends along a third axis to the second patch, the third axis being orthogonal to the first axis and orthogonal to the second axis.

2. The antenna device as claimed in claim 1, wherein the first patch and the second patch have a different width along the second axis.

3. The antenna device as claimed in claim 1, further comprising an array of a plurality of antennas, the plurality of antennas including the antenna.

4. The antenna device as claimed in claim 3, wherein a difference in size of the first patch and the second patch is different for at least two antennas of the array.

5. The antenna device as claimed in claim 3, wherein the offset between the first patch and the second patch is different for at least two antennas of the array.

6. The antenna device as claimed in claim 3, further comprising a power divider configured to distribute power to different antennas of the array.

7. The antenna device as claimed in claim 1, wherein the antenna further includes one or more vias between the first patch and the second patch, the one or more vias extending along the first axis.

8. The antenna device as claimed in claim 1, wherein the first substrate layer and the second substrate layer are composed of different materials.

9. The antenna device as claimed in claim 1, wherein the first substrate layer is composed of a first material having a first dielectric constant, and the second substrate layer is composed of a second material having a second dielectric constant different from the first dielectric constant.

10. The antenna device as claimed in claim 1, wherein the first substrate layer and the second substrate layer have different thicknesses.

11. The antenna device as claimed in claim 1, wherein the second patch is arranged on a first area of a surface of the second substrate layer, and the antenna further includes a ground metal layer arranged on a second area of the surface of the second substrate layer opposite to the first area.

12. The antenna device as claimed in claim 1, further comprising a through-substrate via configured to carry signals from one side of the first substrate layer to another side of the second substrate layer.

13. The antenna device as claimed in claim 12, further comprising matching structures connected to connection pads of the through-substrate via.

14. The antenna device as claimed in claim 1, wherein the antenna includes a plurality of first patches and a plurality of second patches, the plurality of first patches includes the first patch, the plurality of first patches is arranged above the first substrate layer, the plurality of second patches includes the second patch, and the plurality of second patches is arranged above the second substrate layer.

15. The antenna device as claimed in claim 1, wherein the antenna includes a plurality of first patches, the plurality of first patches includes the first patch, the plurality of first patches is arranged above the first substrate layer, and each first patch of the plurality of first patches is arranged spaced apart along the second axis by a first distance.

16. The antenna device as claimed in claim 15, wherein the antenna includes a plurality of second patches, the plurality of second patches includes the second patch, the plurality of second patches is arranged above the second substrate layer, and each second patch of the plurality of second patches is arranged spaced apart along the second axis by a second distance.

17. The antenna device as claimed in claim 16, wherein the first distance is different than the second distance.

18. The antenna device as claimed in claim 16, wherein the first distance is greater than the second distance.

* * * * *